Jan. 12, 1954          W. M. CLARK          2,665,608
FILM VIEWER

Filed Sept. 28, 1951          2 Sheets-Sheet 2

INVENTOR:
Walter M. Clark
By Herbert E. Metcalf
His Patent Attorney

Patented Jan. 12, 1954

2,665,608

UNITED STATES PATENT OFFICE 2,665,608

FILM VIEWER

Walter M. Clark, North Redondo, Calif., assignor to Northrop Aircraft, Inc., Hawthorne, Calif., a corporation of California Application September 28, 1951, Serial No. 248,809

1 Claim. (Cl. 88—24)

My invention relates to means for viewing photographic material, and more particularly to a specialized viewing device capable of combining several images into a single graphic composite for visual study and data reduction purposes. The invention is useful in studying telemetered data with respect to the flight of an aircraft.

Many electromechanical devices play an important part in aircraft guidance and control mechanisms, and many different types of instruments are used to measure and record the behavior and operational characteristics of the various components of the aircraft.

Since actual test flights are made at considerable distance from the observers, and high speed and short lapse of time make direct visual observation impractical, it is desirable to equip the aircraft or missile being guided, and often the ground and airborne guidance stations as well, with automatic instruments to record performance data in some permanent form so that it can be subsequently reproduced under more favorable conditions and with special equipment designed to project or interpret the multiple records in carefully intercorrelated visual forms to combine them simultaneously into a single graphic composite best suited for observation, visual study and analysis.

Briefly this invention comprises a rectangular enclosure having a frontal opening adapted to hold in a substantially upright position a viewing screen of optically clear glass or suitable plastic material having one surface finely ground to provide a translucent surface for making visible images projected thereon by a projector through a suitable opening in one side of the enclosure and thence by means of mirrors onto the rear of the screen.

The front panel of the device is further provided with suitable means for holding in close contact with the front or rear surface of the main viewing screen a plurality of secondary substantially transparent grids or panels bearing printed, drawn or etched scales, diagrams, graphs and other representations serving to facilitate analysis of main projected images by establishing units and increments of measurement of the different variable factors in their proportionate relationship, and combining them visually into one composite picture not only of the various main objects themselves, but of all the interrelated aspects of environment and behavior.

The complete viewing assembly, in addition to the projector, preferably includes the cabinet, a platform at left of the cabinet adapted to hold the projector, an instrument panel on which projector controls are centralized within easy reach of operator, a shelf directly in front of the screen to accommodate measuring instruments and/or additional grids, and an illuminated working surface at right, partially enclosed to keep the light from striking the screen and equipped with writing materials and forms with which observer's notes are made and data reduction records compiled.

A better understanding of the construction and operation of the viewing device of the present invention will be had from reference to the accompanying drawings which show one particular embodiment of my invention, but it is not intended that the particular form and the relative size of the various component units shown herein shall in any way limit the application of the invention to this particular embodiment.

Figure 1:
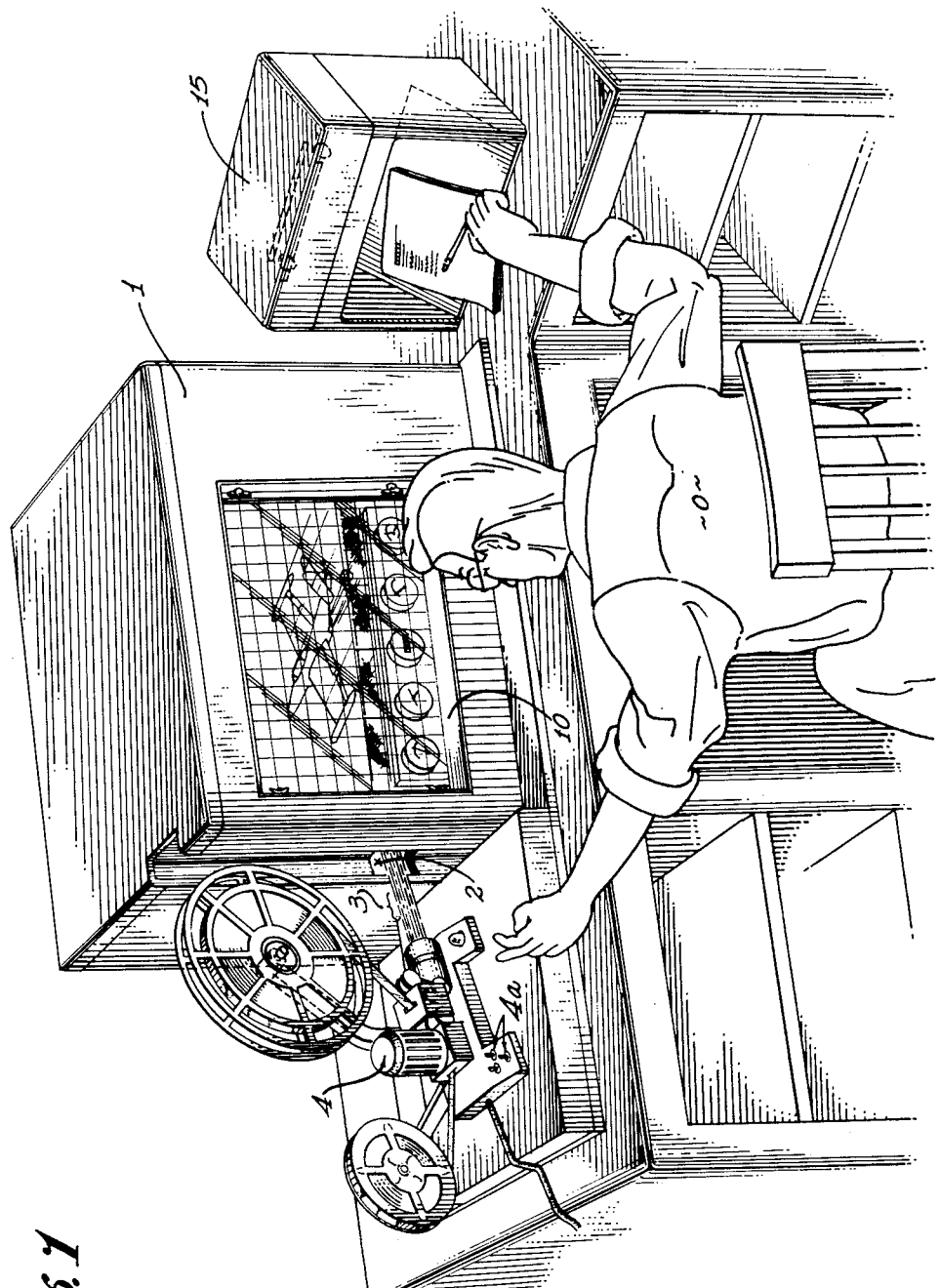
Figure 1 is a perspective view showing the arrangement of units of the preferred embodiment to be described.
Figure 2:
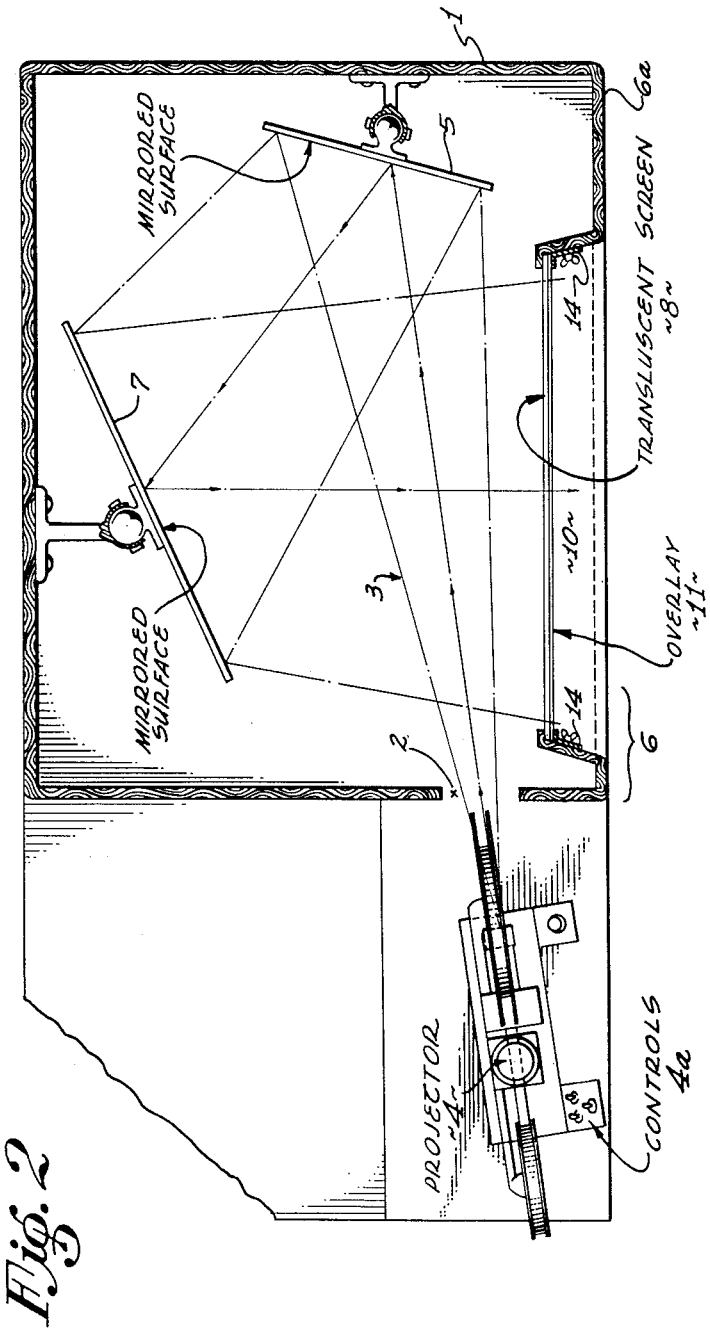
Figure 2 is a diagrammatic cross section taken at beam level showing a preferred mirror arrangement.

As shown in Figure 1, a viewing cabinet 1 is provided having a forwardly positioned side opening 2 through which a light beam 3 is projected from a projector 4 the latter usually being a motion picture projector. The light beam 3 is directed inside cabinet 1 at a side mirror 5 positioned closely behind an opaque portion 6a of the cabinet front 6 at the right of the cabinet as shown in Figure 2. Side mirror 5 is positioned at an angle to reflect the light to a rear mirror 7 from which the light is reflected forwardly to impact the rear of a translucent screen 8 forming the major portion of the cabinet front 6. It will be noted that the light path is horizontal.

Projector 4 is positioned outside cabinet 1 at a slight angle thereto, with the projector controls 4a within easy reach of an observer O in position in front of screen 8, as shown best in Figure 1.

In front of screen 8 a shelf 10 is provided, on which an overlay 11 may be placed, having properly located reference images 12 etc. thereon in a position to cooperate with an image from the projector as shown in Figure 1, and held in place by clamps 14 as best shown in Figure 2.

Conveniently, at the right of the observer O a writing stand 15 may be provided.

The projected images provide a sufficient light background against which the images on overlay 11 are clearly visible so that a single composite image is visible to the observer.

The device as described above has been found exceptionally useful in the interpretation of recorded telemetering values of aircraft in flight, simultaneously viewed with time coordinated motion pictures of the aircraft in flight.

While in order to comply with the statute, the invention has been described in language more or less specific as to structural features, it is to be understood that the invention is not limited to the specific features shown, but that the means and construction herein disclosed comprise the preferred form of putting the invention into effect, and the invention is therefore claimed in any of its forms or modifications within the legitimate and valid scope of the appended claim.

What is claimed is:

A film viewing device comprising: a rectangular cabinet; a front panel of said cabinet having a large generally rectangular opening; a main translucent viewing screen framed in said panel opening, said front panel being further equipped with supporting means for holding an additional screen having fixed images thereon in close contact with said main viewing screen; means defining an opening on one side of said cabinet substantially at a front edge thereof, and a vertically extending recessed channel on said one side, said channel having solid sides and bottom thereof except for said opening which is provided through said channel, whereby outside light is hindered from shining directly on the rear of said screens; means for mounting a picture film projector outside said cabinet at said one side to project a light beam through said opening across the back of said main screen toward the opposite side of said cabinet; a first mirror positioned to intercept said beam at said opposite side and out of the line of sight of an observer of said screens, and at an angle to said beam to reflect said beam rearwardly in said cabinet; and a second mirror at the rear of the interior of said cabinet and positioned to reflect light of said beam from said first mirror onto the back of said main screen to form a projected image thereon when said projector is operating, said mirrors being mounted on ball and socket brackets for easy adjustment in two planes, whereby said images on said additional screen and said projected image become combined into a single simultaneously viewed composite image.

WALTER M. CLARK.

References Cited in the file of this patent

UNITED STATES PATENTS

| Number | Name | Date |
|---|---|---|
| 1,153,685 | Guerzoni | Sept. 14, 1915 |
| 1,428,347 | Altena | Sept. 5, 1922 |
| 2,414,871 | Harper | Jan. 18, 1947 |
| 2,477,923 | Fitt | Aug. 2, 1949 |
| 2,576,586 | Frankel | Nov. 27, 1951 |